(12) United States Patent
Mo (10) Patent No.: US 12,223,120 B2
(45) Date of Patent: Feb. 11, 2025

(54) COMPUTER KEYBOARD WITH TELEPHONE KEYPAD, AND ELECTRONIC EQUIPMENT

(71) Applicant: Xiaodong Mo, Beijing (CN)

(72) Inventor: Xiaodong Mo, Beijing (CN)

( * ) Notice: Subject to any disclaimer, the term of this patent is extended or adjusted under 35 U.S.C. 154(b) by 0 days.

(21) Appl. No.: 18/547,414

(22) PCT Filed: Feb. 21, 2022

(86) PCT No.: PCT/CN2022/000025
§ 371 (c)(1),
(2) Date: Aug. 22, 2023

(87) PCT Pub. No.: WO2022/174686
PCT Pub. Date: Aug. 25, 2022

(65) Prior Publication Data
US 2024/0126379 A1    Apr. 18, 2024

(30) Foreign Application Priority Data
Feb. 22, 2021   (CN) .................. 202110195072.6

(51) Int. Cl.
*G06F 3/02* (2006.01)
*H01H 13/83* (2006.01)
(Continued)

(52) U.S. Cl.
CPC .......... *G06F 3/0219* (2013.01); *H01H 13/83* (2013.01); *G06F 3/023* (2013.01);
(Continued)

(58) Field of Classification Search
CPC ....... G06F 3/0219; G06F 3/023; H01H 13/83; H01H 2219/039; H04M 1/2473; H04M 2242/16
(Continued)

(56) References Cited

U.S. PATENT DOCUMENTS

2002/0126153 A1* 9/2002 Withers ................ G06F 3/0482
715/773
2005/0237228 A1* 10/2005 Salman ................... H04M 1/23
341/22
(Continued)

FOREIGN PATENT DOCUMENTS

CN   201177796 Y   1/2009
CN   102096472 A   6/2011
(Continued)

*Primary Examiner* — Tom V Sheng
(74) *Attorney, Agent, or Firm* — Geoffrey Lottenberg; Berger Singerman LLP (57) ABSTRACT

Provided are a computer keyboard with a telephone keypad, and an electronic equipment, which relate to the technical field of computer peripherals and human-computer interaction. A main keyboard of the computer keyboard includes a nine-grid numeric key area; the telephone keypad is mapped to the nine-grid numeric key area, and is switched by a key Tel; a numeric keypad is also superposed and multiplexed in the inner nine-grid numeric key area, adopts an arrangement of 123 456 789, and is switched by a key NumLock; and further a scientific calculator is integrated with the computer keyboard. The computer keyboard is not only convenient for making a call, but also can achieve one-hand operation of a T9 input method, and can be used as a scientific calculator of windows 10.

10 Claims, 7 Drawing Sheets

(51) Int. Cl.
*G06F 3/023* (2006.01)
*H04M 1/247* (2021.01)

(52) U.S. Cl.
CPC ..... *H01H 2219/039* (2013.01); *H04M 1/2473* (2013.01); *H04M 2242/16* (2013.01)

(58) Field of Classification Search
USPC .......................................................... 345/168
See application file for complete search history.

(56) References Cited

U.S. PATENT DOCUMENTS

| | | | |
|---|---|---|---|
| 2005/0245293 A1* | 11/2005 | Provencher | H04M 1/23 455/575.1 |
| 2007/0076859 A1* | 4/2007 | Petkov Tzvetanov | G06F 3/0219 379/93.09 |
| 2010/0149107 A1* | 6/2010 | Perry | G06F 3/0237 345/170 |
| 2012/0242583 A1* | 9/2012 | Molgaard | G06F 3/0235 345/169 |
| 2016/0170497 A1 | 6/2016 | Gardner et al. | |
| 2019/0322186 A1 | 10/2019 | Petersen | |

FOREIGN PATENT DOCUMENTS

| | | |
|---|---|---|
| CN | 105353886 A | 2/2016 |
| CN | 209327983 U | 8/2019 |
| CN | 110806808 A | 2/2020 |
| CN | 111984128 A | 11/2020 |
| CN | 112732101 A | 4/2021 |

* cited by examiner

COMPUTER KEYBOARD WITH TELEPHONE KEYPAD, AND ELECTRONIC EQUIPMENT

CROSS-REFERENCE TO RELATED APPLICATION

This patent application is a national stage of International Application No. PCT/CN2022/000025, filed on Feb. 21, 2022, which claims the benefit and priority of Chinese Patent Application No. 202110195072.6 filed with the China National Intellectual Property Administration on Feb. 22, 2021 and entitled "COMPUTER KEYBOARD WITH TELEPHONE KEYPAD, AND ELECTRONIC EQUIPMENT". Both of the aforementioned applications are incorporated by reference herein in their entireties as part of the present application.

TECHNICAL FIELD

The present disclosure relates to the technical field of computer peripherals and human-computer interaction, and in particular to a computer keyboard with a telephone keypad, and an electronic equipment.

BACKGROUND

A telephone keypad derived from an early rotary dial telephone. A pulse and dual-tone multi-frequency key dial telephone, into which keys * and #were added on the basis of 10 numbers of 0-9 of the rotary dial telephone, was developed. A computer keyboard derived from a mechanical typewriter keyboard, and later was added with a numeric keypad (which derived from a mechanical calculator keyboard), cursor control keys and function keys F1-F12. At present, the computer keyboard and the telephone keypad are independent keyboards. Although the computer keyboard has a 3*3 numeric keypad, the numeric keypad adopts an arrangement of a calculator that is opposite to that of the telephone keypad and lacks keys * and #, which does not conform to usage habits of the telephone keypad. Therefore, it is difficult to use the numeric keypad as the telephone keypad. The computer keyboard has a working principle as follows: a keyboard controller transmits a scan code to a computer; the computer receives the scan code, and hands the scan code over to a keyboard driver; the keyboard driver converts the scan code into a keyboard virtual key code; the keyboard virtual key code is independent of specific hardware, and a virtual key code of the same key is always the same for keyboards from different manufacturers; the keyboard driver transmits the scan code and the virtual key code of the keyboard operation, and other information to an operating system; the operating system encapsulates obtained information in a keyboard message and inserts the keyboard message into a message queue; with a message system of Windows, the keyboard message is sent to a certain window; and an application where the window is located receives the message, can learn about information about the keyboard operations, and then makes a certain response. If the computer keyboard is classified according to the number of key areas, it is typically divided into a three-key-area desktop keyboard, a two-key-area game mechanical keyboard and a single-key-area laptop keyboard. The computer keyboard is divided into four parts according to functions: a main keyboard, i.e. alphabetical keyboard (which is also called as a typewriter keyboard) in QWERTY layout, function keys (F1-F12), a 3*3 numeric keypad, and edit keys (cursor control keys). The virtual key codes of 10 numeric keys of 0-9 arranged in 1*10 on the main keyboard are different from those of numeric keys of 0-9 arranged in 3*3 on the numeric keypad. With the popularization of a smart television, the smart television will be the center in families to realize the interconnection of smart appliances in future. Various smart appliances, including computers, telephones, cell phones and tablet computers, will be connected to each other. The smart television has far more functions than an ordinary television, and can no longer satisfy the requirements of human-computer interaction only by relying on a remote control. As a result, it will be an inevitable choice for the smart television to be externally connected to the computer keyboard. The smart television or the computer can achieve voice and video call functions, which requires integration of the telephone keypad into the computer keyboard. The telephone keypad usually has twelve keys with an arrangement of 123 456 789 *0 #. Keys * and #are both essential for a cell phone keypad or a landline keypad. It is very important for users who use T9 input method of a cell phone for a long time, to implement a one-hand T9 input method through the telephone keypad. Different from the telephone keypad, the numeric keypad has no key #. In a row of numeric keys arranged in 1*10 on the main keyboard, a symbol #can be obtained by keys shift+3 (numeric key 3 on the main keyboard), and a symbol * can be obtained by keys shift+8 (numeric key 8 on the main keyboard). The key * on the numeric keypad is used as a multiplication key in four operators of +—*/, and the virtual key code of the key * on the numeric keypad is different from that of the key * on the main keyboard. The numeric keypad has an arrangement of 789 456 123 opposite to that of numeric keys 123 456 789 of on the telephone keypad. The laptop keyboard below 14 inches has a single-key area, and does not have an independent 3*3 numeric keypad. In a previous laptop, the 3*3 numeric keypad is superimposed on a right half of the main keyboard, is multiplexed with letter keys U I O J K L, and is converted by a key NumLock (or keys Fn+NumLock). Since the letter keys are obliquely arranged, such a superimposition makes the 3*3 numeric keypad on the laptop inconvenient to use, resulting in poor usability and user experience. In fact, the 3*3 numeric keypad arranged obliquely is rarely used since it does not conform to users' usage habits, is easy to operate by mistake, and it is impossible to achieve blind typing numeric input. An existing laptop has thoroughly abandoned the multiplexed 3*3 numeric keypad, and only retains a row of 1*10 numeric keys arranged on the main keyboard. In short, it is difficult to use the 3*3 numeric keypad superimposed obliquely and multiplexed or the numeric keys arranged in 1*10 on the main keyboard as the telephone keypad. To sum up, neither a three-keypad desktop keyboard nor a single-key-area laptop keyboard has a telephone keypad that conforms to users' usage habits. In view of this, it is impossible to implement the one-hand T9 input method. Moreover, when an Internet call is made by the computer or a television call is made by the smart television, there is no easy-to-use physical telephone keypad. Only the virtual keyboard on a screen can be controlled by a mouse or a remote control to make a call, which seriously affects efficiency of human-computer interaction and user experience. In the technical solution of the present disclosure, the telephone keypad is integrated into the computer keyboard, thereby successfully solving the above problem existing in the computer keyboard.

SUMMARY

A main objective of some embodiments of the present disclosure is to provide an inner nine-grid computer keyboard integrated with a telephone keypad, which solves the problem existing in the prior art, thereby being more suitable for practical use, providing better user experience, and having industrial use value.

A computer keyboard with a telephone keypad according to the present disclosure includes:

a main keyboard in QWERTY layout, where the main keyboard includes an inner nine-grid numeric key area; and twelve keys of the telephone keypad including 123 456 789 *0 #are mapped to the inner nine-box-grid numeric key area.

The objective and technical solution of some embodiments of the present disclosure may be further implemented by the following technical measures.

In a main keyboard area of a three-key-area desktop keyboard or a main keyboard area of a single-key-area laptop keyboard, standard keys are replaced with special keys, to realize transition and conversion from oblique arrangement to vertical arrangement, and obtain an inner nine-grid numeric key area arranged vertically. The telephone keypad is mapped to the inner nine-grid numeric key area arranged vertically, and is superposed and multiplexed with keys of the inner nine-grid numeric key area;

twelve keys of the telephone keypad including 123 456 789 *0 #are mapped to the keys of the inner nine-grid numeric key area, superposed and multiplexed in the key area, and switched by a key Tel; and when an Internet call is made by a computer or a television call is made by a smart television, the key area achieves a function of the telephone keypad.

On the other hand, the present disclosure further provides an electronic equipment. The electronic equipment includes:

a body apparatus;

a processor arranged in the body apparatus; and a computer keyboard with a telephone keypad that is connected to the processor.

Compared with the prior art, the present disclosure has the beneficial effects: the computer keyboard with a telephone keypad is provided, such that a main keyboard area of the three-key-area desktop keyboard or a main keyboard area of the single-key-area laptop keyboard has the inner numeric key area arranged in a nine-grid; the computer keyboard is integrated with the telephone keypad; it is convenient for people to make an Internet call or control a smart television to make a television call through the computer keyboard; and one-hand input of a nine-grid keyboard can be achieved through a T9 input method on the telephone keypad, which is important for a user who uses the T9 input method of a cell phone for a long time. In addition, when a mouse is used with a right hand, characters or numbers can be input merely with a left hand through the T9 input method, thereby improving input efficiency and user experience.

What is described above is only an overview of the technical solutions of the present disclosure. In order to more clearly understand the technical means of the present disclosure and implement the present disclosure according to the contents of the description, the present disclosure will be described in detail below with reference to the preferred embodiments and in combination with the accompanying drawings.

BRIEF DESCRIPTION OF THE DRAWINGS

The present disclosure will be further described below with reference to the accompanying drawings and the embodiments.

DETAILED DESCRIPTION OF THE EMBODIMENTS

Figure 1:
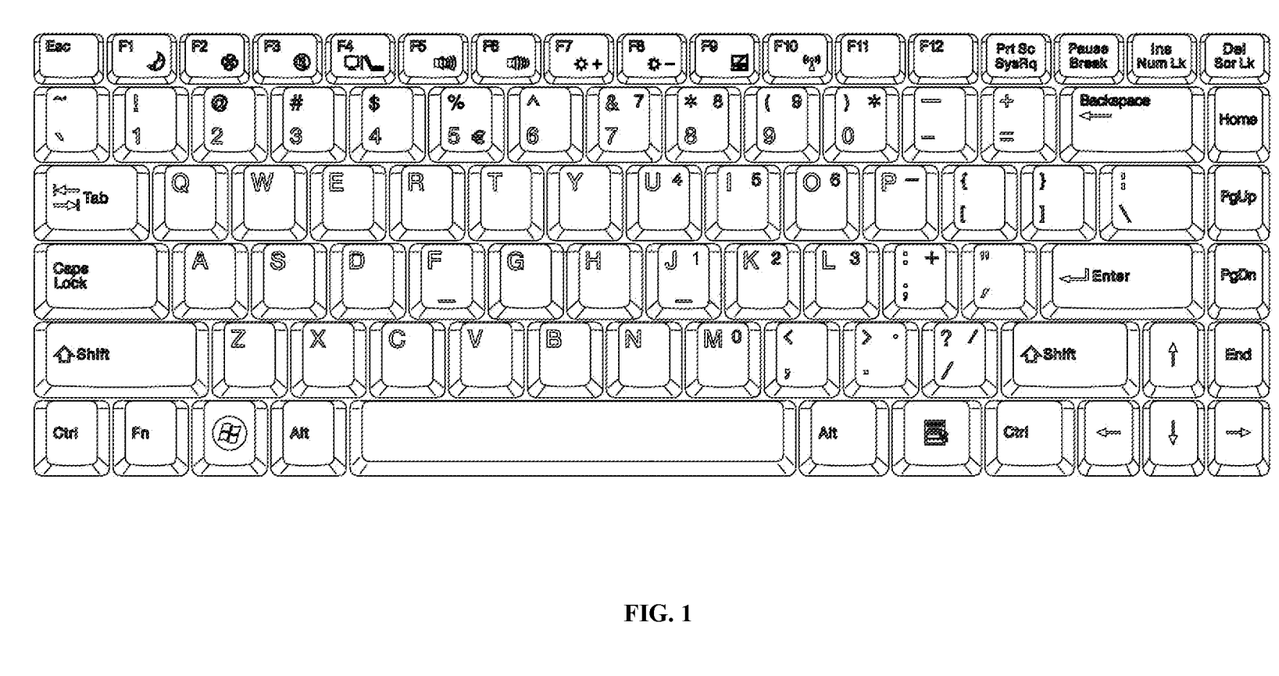
FIG. 1 shows a previous single-key-area laptop keyboard, i.e. a horizontal Enter American keyboard, where a 3*3 numeric keypad is obliquely superimposed on letter keys U I O J K L of a main keyboard area, is multiplexed with the letter keys, and is converted by keys Fn+NumLock. Although the 3*3 numeric keypad is provided in the technical solution, usability is extremely poor, people prefer to use a row of numeric keys arranged in 1*10 on a main keyboard, but rarely use the 3*3 numeric key area superimposed obliquely and multiplexed. The solution is mainly used by the previous 14-inch American laptop. In a current laptop, the multiplexed 3*3 numeric keypad is completely abandoned, and only the row of numeric keys arranged in 1*10 on the main keyboard is retained. It is difficult to use the 3*3 numeric keypad superimposed obliquely and multiplexed or the row of numeric keys arranged in 1*10 on the main keyboard as a telephone keypad.

As shown in FIG. 1, no first numeric key area (i.e. outer 3*3 numeric key area), and no second numeric key area (i.e. inner numeric key area or inner 3*3 numeric key area) are provided. Although a first numeric keypad (NumLock numeric keypad) is provided, no first numeric key area is provided. The first numeric keypad is superimposed and multiplexed in a main keyboard. Since no second numeric key area is constructed in the main keyboard, oblique arrangement of keys causes poor usability of the first numeric keypad.

Figure 2:
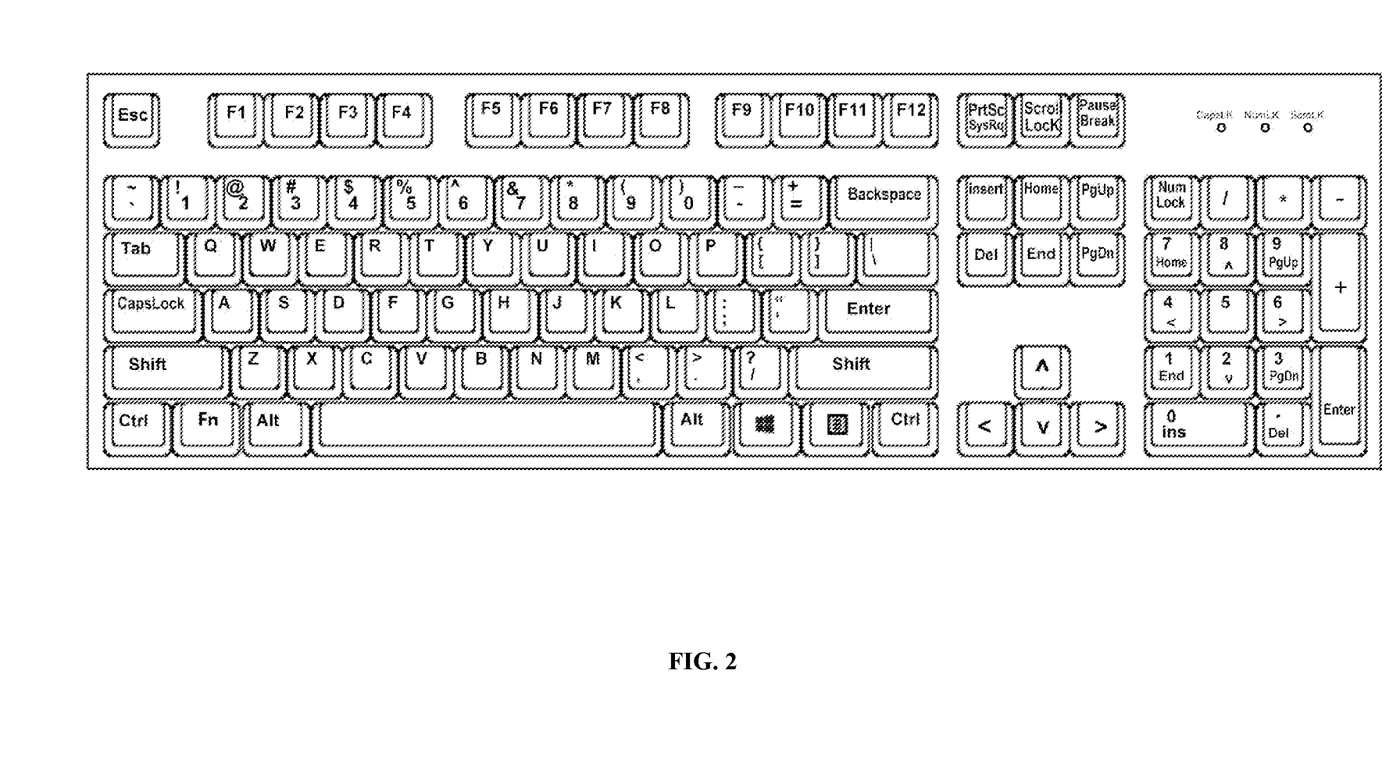
FIG. 2 shows a three-key-area desktop keyboard, where a horizontal Enter American keyboard is divided into four parts according to functions: a main keyboard, i.e. alphabetical keyboard in QWERTY layout (which is also called as a typewriter keyboard), function keys (F1-F12), a 3*3 numeric keypad, and edit keys (cursor control keys). Virtual key codes of ten numeric keys of 0-9 arranged in 1*10 on the main keyboard are different from those of numeric keys of 0-9 arranged in 3*3 on the numeric keypad, and corresponding American standard code for information interchange (ASCII) codes of them are the same. In a row of numeric keys arranged in 1*10 on the main keyboard, a symbol #may be obtained by keys shift+3 (numeric key 3 on the main keyboard), and a symbol * may be obtained by keys shift+8 (numeric key 8 on the main keyboard). A key * on the numeric keypad is used as a multiplication key in four operators of +—*/, and has a virtual key code (VK_MULTIPLY) different from the virtual key code (shift+VK_8) of a key * on the main keyboard, and corresponding ASCII codes of them are the same. The numeric keypad has an arrangement of 789 456 123 opposite to that of 123 456 789 of numeric keys on the telephone keypad. It is difficult to use the independent numeric keypad or the row of numeric keys arranged in 1*10 on the main keyboard as the telephone keypad.

As shown in FIG. 2, a traditional three-key-area desktop keyboard only has a first numeric key area (outer 3*3 numeric key area) and a first numeric keypad (NumLock numeric keypad), and has no second numeric key area (inner numeric key area) and no second numeric keypad (Tel telephone keypad). Since no second numeric key area (inner numeric key area) is constructed in the main keyboard, the second numeric keypad may not be mapped.

Figure 4:
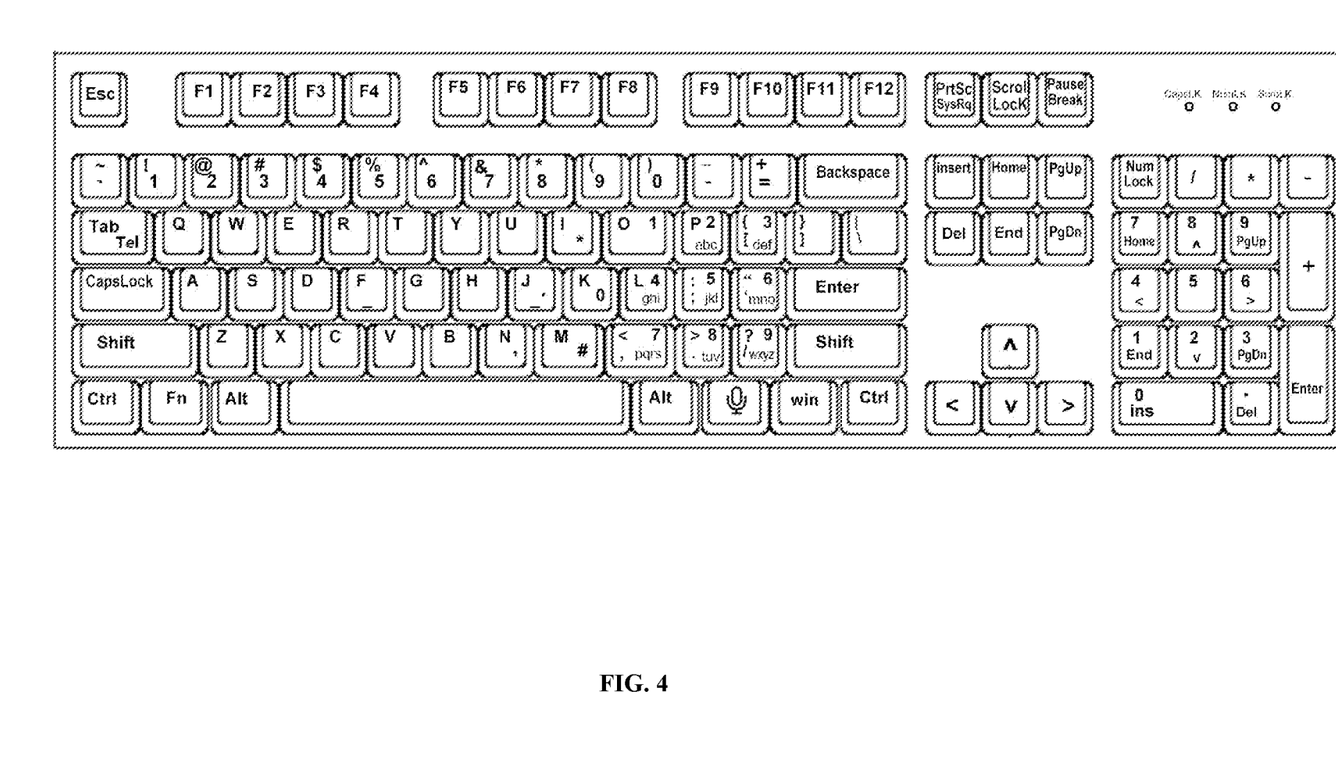
FIG. 4 is Embodiment 1 of the present disclosure.

FIG. 4 shows Embodiment 1 of the present disclosure, which is a three-key-area office membrane desktop keyboard having a key Fn, i.e. American horizontal Enter keyboard. In a main keyboard area in QWERTY layout, standard keys O, M and < are replaced with 1.25 times of special keys, such that transition and conversion from oblique arrangement to vertical arrangement is achieved, an inner nine-grid 3*3 numeric key area arranged vertically is obtained, and a second numeric key area is formed by the inner nine-grid 3*3 numeric key area and keys around the inner nine-grid 3*3 numeric key area. By adjusting a keyboard driver, virtual key codes of numeric keys of 0-9 and virtual key codes of * #, in the main keyboard area are remapped, such that 14 keys 123 456 789 *0 #, of a telephone keypad are superimposed and multiplexed in the inner numeric key area, and a mapping relation is established between the keys and scan codes of corresponding keys. A new keyboard driver is stored in an erasable programmable read only memory (EPROM) or a flash of a microcontroller unit (which is also known as a single chip microcomputer) of the keyboard in a firmware. Fn+Tab=Tel is set to switch the keyboard driver to switch a function of an original key to a function of a telephone key, and a voice mode switch key (which is located on a right side of a key alt) is provided.

When an Internet call is made by a computer or a television call is made by a smart television, the inner nine-grid telephone keypad integrated achieves a function of a dial key. Twenty-six letters corresponding to a T9 input method are provided on the inner nine-grid telephone keypad, and five Chinese character input strokes of a horizontal stroke, a vertical stroke, a left-falling stroke, a right-falling stroke and a turning stroke are further provided on the inner nine-grid telephone keypad, which is extremely useful for a user who uses the T9 input method (including a nine-grid Chinese pinyin input method and a nine-grid Chinese stroke input method) of a cell phone. In addition, for a general user, when a mouse is used with a right hand, characters or numbers can be input with one hand through the T9 input method. The mode of double-hand cooperation of left-hand keyboard operation and right-hand mouse operation can improve input efficiency and user experience. The embodiment integrates the telephone keypad and the three-key-area desktop keyboard. Since a comma (,), an English period and a decimal separator (.) are extremely important, the decimal separator is indispensable when numbers are input, and the comma (,) should be added for division every three digits, for example, between thousands and tens of thousands, and between hundreds of thousands and millions. When the T9 input method on the telephone keypad is used, the comma (,) and the period (.) need to be added in the text to break sentences. Therefore, when the telephone keypad is switched by Fn+Tab=Tel (Telephone), apart from * being mapped to a letter key I and #being mapped to a letter key M, the comma (,) being further mapped to a letter key N, and the English period and the decimal separator (.) being mapped to a letter key J, the telephone keypad actually reflects a total of 14 symbols, including 123 456 789 *0 #(,) the comma and (.) the English period. By comparing FIG. 4 with FIG. 2, it may be seen that in the embodiment, apart from the NumLock numeric keypad (calculator keypad or first numeric keypad) of the outer numeric key area (first numeric key area), a second numeric keypad (Tel telephone keypad) of the inner numeric key area is further provided, and the NumLock numeric keypad and the second numeric keypad are independent of each other. The first numeric keypad and the second numeric keypad are not doubly superposed and multiplexed into the inner numeric key area (second numeric key area), the Tel telephone keypad has an arrangement of 123 456 789, and the NumLock numeric keypad still maintains an arrangement of 789 456 123 of a calculator keypad.

Figure 5:
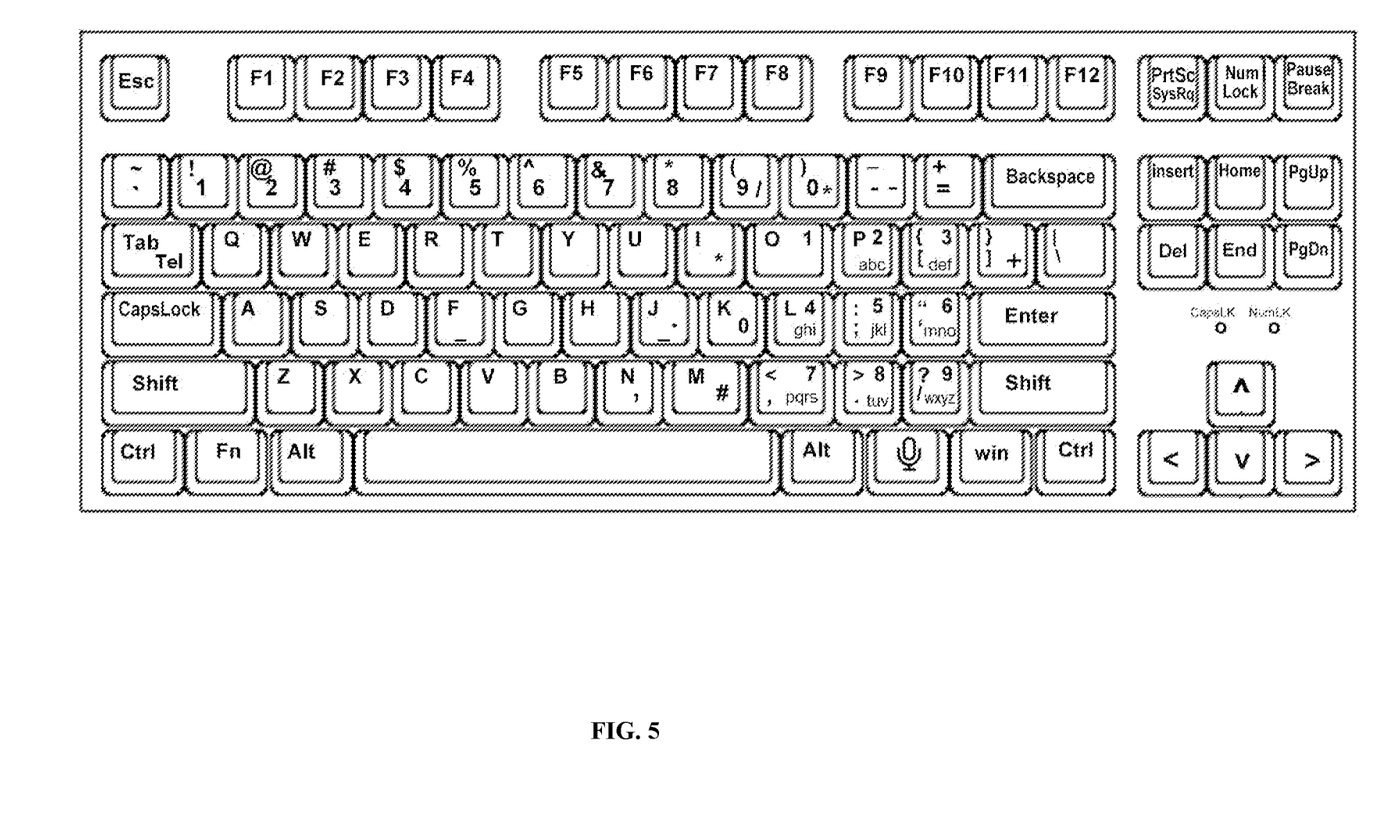
FIG. 5 is Embodiment 2 of the present disclosure.

FIG. 5 shows Embodiment 2 of the present disclosure, which differs from Embodiment 1 as follows:

(1) For a two-key-area gaming mechanical keyboard, since the two-key-area game mechanical keyboard lacks a first numeric key area (outer 3*3 numeric key area), and an independent first numeric keypad (NumLock numeric keypad) is omitted, it is inconvenient to use a calculator. Therefore, in the embodiment, an inner nine-grid key area superimposes and multiplexes not only a Tel telephone keypad, but also the NumLock numeric keypad (including four operators of +—*/), and differs from the first numeric keypad (outer 3*3 numeric key area) in that a calculator numerical arrangement of 789 456 123 is replaced with a telephone arrangement of 123 456 789. The first numeric keypad and a second numeric keypad are both superposed on the second numeric key area, and share the inner numeric key area.

(2) Since the mechanical keyboard may control a lighting effect of light emitting diode (LED) backlight of each key, in the embodiment, when a telephone keypad is switched by Fn+Tab=Tel, 14 keys including 123 456 789 *0 #, of a telephone keypad emit light; and when the first numeric keypad is switched by NumLock, keys of 123 456 789 0 (.) a decimal separator and four operators of +−*/emit light.

Figure 6:
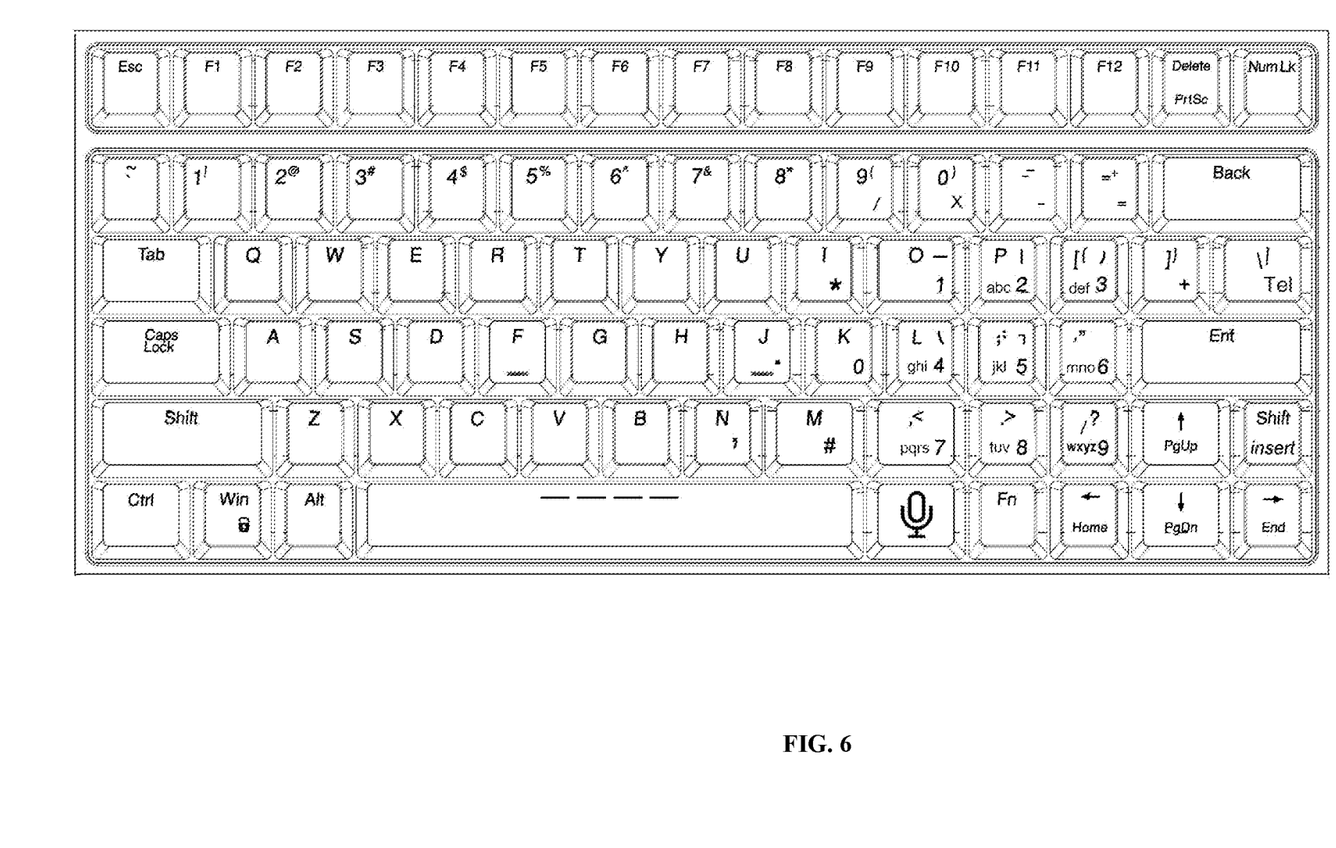
FIG. 6 is Embodiment 3 of the present disclosure.

FIG. 6 shows Embodiment 3 of the present disclosure, which differs from Embodiment 2 as follows:

(1) A 13-inch American horizontal Enter single-key-area laptop is a membrane keyboard having only one key area.

Figure 7:
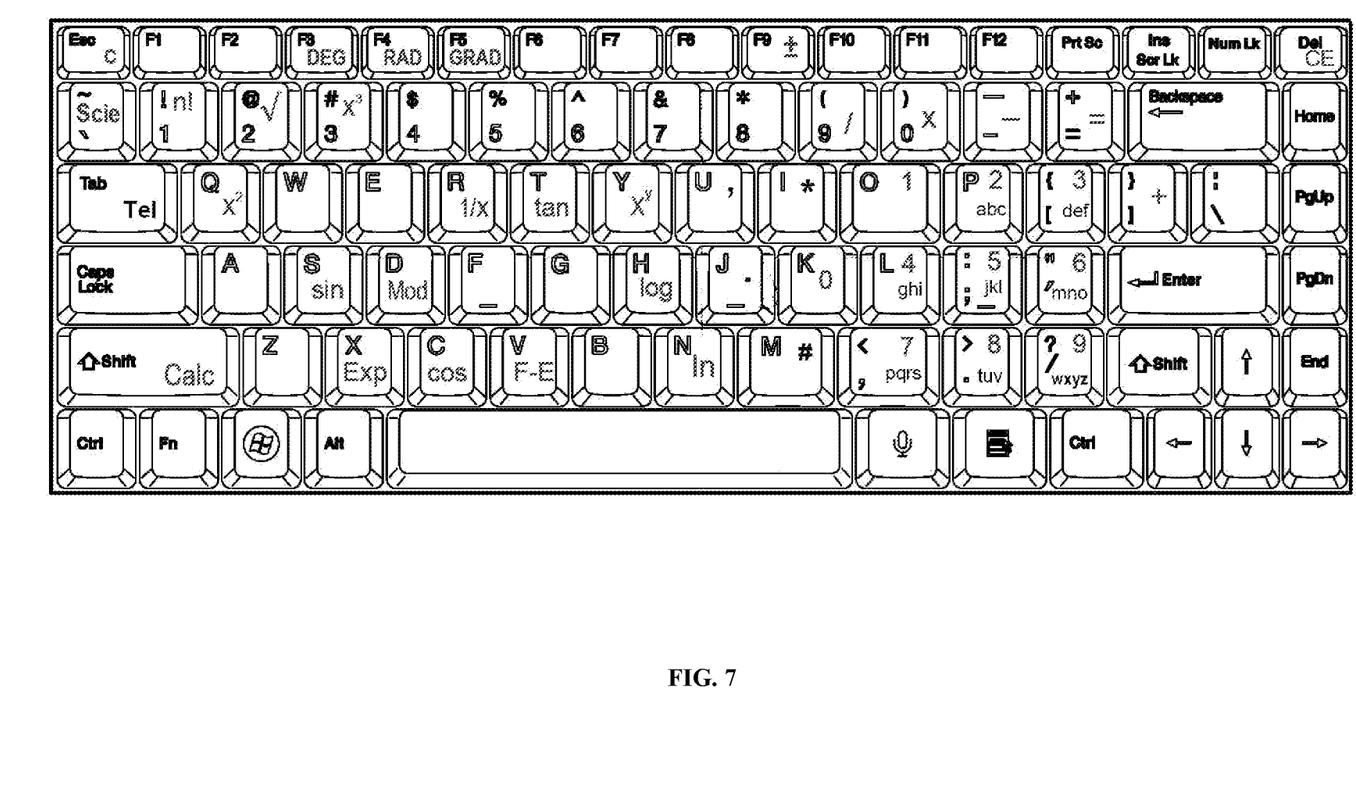
FIG. 7 is Embodiment 4 of the present disclosure.

(2) Since a single-key-area laptop keyboard has no first numeric key area (outer 3*3 numeric key area), and only has a second numeric key area (inner numeric key area), and a NumLock first numeric keypad is also superimposed on the second numeric key area, and shares the second numeric key area with a Tel second numeric keypad, the first numeric keypad and the second numeric keypad are doubly superimposed and multiplexed with the second numeric key area, and uniformly uses a telephone arrangement of 123 456 789. The embodiment integrates the Tel telephone keypad, the NumLock numeric keypad and the single-key-area laptop keyboard. FIG. 7 shows Embodiment 4 of the present disclosure, which differs from Embodiment 3 as follows:

(1) A 14-inch American horizontal Enter single-key-area laptop is provided. (2) On the basis of a NumLock first numeric keypad, various function operations and function keys of a scientific calculator are mapped to other keys around an inner nine-grid 3*3 numeric keypad, and are superposed and multiplexed in the keys. When a calculator of win 10 runs in a scientific calculator mode, the keys achieve various function operations and function keys. Specific mapping relations are as follows: a first row of keys: Esc-C, F3-DEG, F4-RAD, F5-GRAD, F9–"+−", Delete-CE; a second row of keys: 1-n!, 24, 3-X^3; a third row of keys: Q-X^2, R−1/X, T-tan, Y-X^y; a fourth row of keys: S-sin, D-Mod, H-log; and a fifth row of keys: X-Exp, C-cos, N-ln. In addition, Fn+left shift=Calc (Calculator) is set. That is, a combination of Fn+left shift directly opens the calculator of the win10; and when the calculator of the win10 runs in the scientific calculator mode, Fn+('~)=Scie (Scientific calculator) is set as a switch, that is, a combination of Fn+('~) activates various function operations and function keys used in the scientific calculator. The embodiment is a membrane keyboard. In order to distinguish characters on a QWERTY keyboard from those on the membrane keyboard, characters on the telephone keypad of the inner nine-grid 3*3 numeric keypad, and characters of the function operations and the function keys of the scientific calculator are printed in different colors. The embodiment integrates the Tel telephone keypad, the NumLock numeric keypad, the scientific calculator keyboard and the single-key-area laptop keyboard.

(3) The embodiment further maps various function operations and function shortcut keys of the scientific calculator arranged in the Windows to other keys around the second numeric key area, and superposes and multiplexes the keys. When the calculator arranged in Windows runs in a scientific calculator mode, the keys achieve various function operation shortcut keys. The embodiment is a membrane keyboard, and in order to distinguish characters on a QWERTY keyboard, characters on the telephone keypad in the second numeric key area, and characters of the function operations and the function keys of the scientific calculator are printed in different colors. The embodiment integrates the Tel telephone keypad, the NumLock numeric keypad, the scientific calculator keypad and the single-key-area laptop keyboard.

Figure 3:
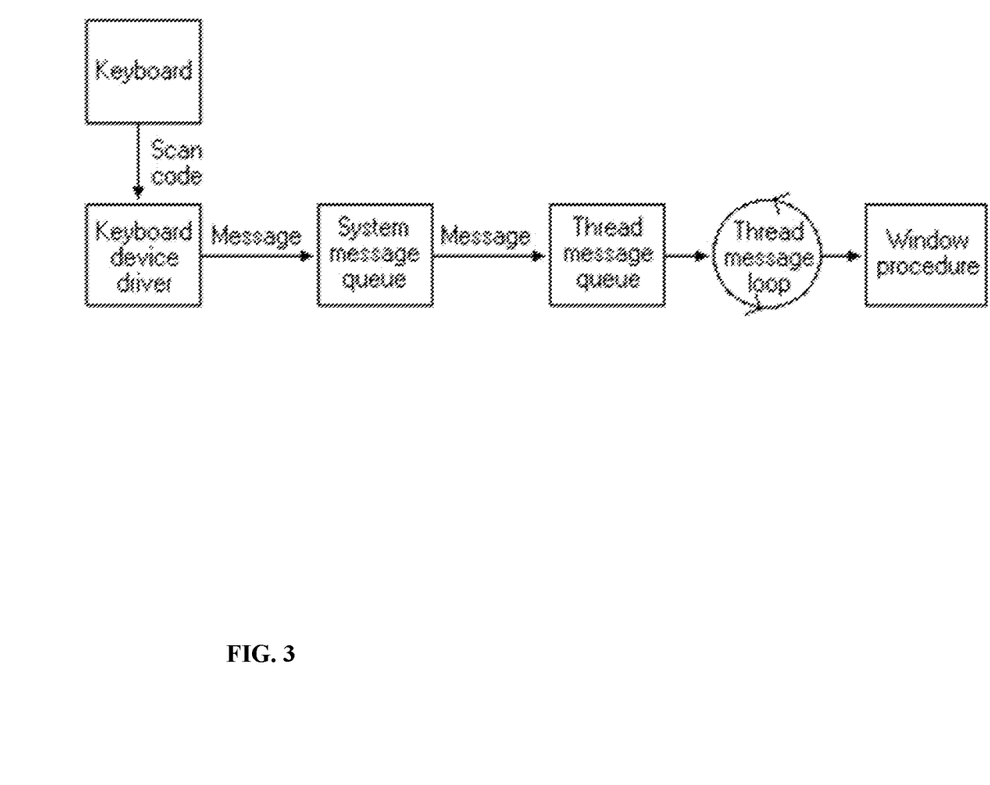
FIG. 3 is a diagram of illustration of a keyboard input model.

The above four embodiments are all for programmable keyboards having a key Fn, and are implemented by means of an improved keyboard driver. As shown in FIG. 3, a working principle of a computer keyboard is as follows: when a user presses a key, 1. a keyboard microcontroller unit (MCU) detects the action and generates a scan code, where each key corresponds to a unique scan code; 2. the scan code is sent to a keyboard driver; 3. the keyboard driver maps the scan code to a keyboard virtual key code VirtualKey; 4. the scan code, the keyboard virtual key code, and other information are transferred to a Windows operating system; 5. the Windows operating system encapsulates obtained information in a keyboard message and inserts the keyboard message into a message queue; and 6. with a Windows message system, the keyboard message is sent to a certain window. The VirtualKey is saved in wParam and lParam parameters of WM_KEYDOWN, WM_KEYUP, WM_SYSKEYDOWN and WM_SYSKEYUP messages. Specifically, wParam specifies a virtual key code for a non-system key, and lParam specifies a number of repetitions, a scan code, an extended key identifier, a context code, a previous key status identifier, and a transition status identifier. When a character key on the keyboard is tapped, the system generates WM_KEYDOWN and WM_KEYUP messages. WM_KEYDOWN corresponds to a make code of the scan code, and WM_KEYUP corresponds to a break code of the scan code. Additional parameters (wParam and lParam) of the two messages include information such as the virtual key code VirtualKey and the scan code. It is often necessary to obtain an ASCII code of a certain character in a program. A Translate Message function may convert a combination of WM_KEYDOWN and WM_KEYUP into a WM CHAR message. The wParam additional parameter of the WM CHAR includes an ASCII code of the character.

On the basis of a working principle of the keyboard, a programmable keyboard having a key Fn is used to establish a mapping relation between virtual key codes of numeric keys 0-9 arranged in 1*10 on the main keyboard area and scan codes of keys of a 3*3 second numeric key area (inner numeric key area) arranged vertically by adjusting the keyboard driver and modifying the mapping relation between the virtual key and the scan code; a scan code of a key 0 corresponds to a virtual key code VK_1, a scan code of a key P corresponds to a virtual key code VK_2, and so on, so that the corresponding relation between the virtual key codes VK_0-VK_9 of the numeric keys 0-9 arranged in 1*10 on the main keyboard area and the scan codes of the keys of the 3*3 second numeric key area arranged vertically is reestablished; and a virtual key code shift+VK_8 of a key * corresponds to a scan code of a key I, and a virtual key code shift+VK_3 of a key #corresponds to a scan code of a key M, such that twelve keys of the telephone keypad 123 456 789 *0 #are superimposed and multiplexed in the second numeric key area, and are switched by Tel. The comma (,) VK_COMMA is mapped to a letter key N, and a period and decimal separator key (.) VK_PERIOD is mapped to a letter key J, and a total of 14 symbols including 123 456 789 *0 #, the comma and the period are mapped in the second numeric key area: VK_0-VK_9, shift+VK_8, shift+VK_3. VK_COMMA, VK_PERIOD. A calculator numeric keypad on an original computer keyboard switched by the key NumLock is the first numeric keypad, and has virtual key codes: VK_NUMPAD0-VK_NUMPAD9, VK_MULTIPLY, VK_ADD, VK_SUBTRACT, VK_DIVIDE, VK_DECIMAL; and the telephone numeric keypad switched by the key Tel is the second numeric keypad independent of the NumLock first numeric keypad, and has virtual key codes: VK_0-VK_9, shift+VK_8, shift+VK_3. VK_COMMA, VK_PERIOD.

In the above four embodiments, standard keys are replaced with special keys in the main keyboard area of the computer keyboard, such that transition and conversion from oblique arrangement to vertical arrangement is achieved, and the inner nine-grid 3*3 numeric key area arranged vertically is obtained. In Embodiment 1, the telephone keypad is integrated with the three-key-area desktop keyboard. The Tel telephone keypad has an arrangement of 123 456 789, and the NumLock numeric keypad still maintains an arrangement of 789 456 123. In Embodiment 2, the telephone keypad is integrated with the NumLock numeric keypad and the two-key-area game mechanical keyboard. In Embodiment 3, the telephone keypad is integrated with the NumLock numeric keypad and the single-key-area laptop keyboard. In Embodiment 4, the telephone keypad is integrated with the NumLock numeric keypad, the scientific calculator keypad and the single-key-area laptop keyboard. For the two-key-area keyboard and the single-key-area keyboard, the NumLock numeric keypad and the Tel telephone keypad share the second numeric key area, and both uniformly use the arrangement of 123 456 789.

The embodiments according to the present disclosure have at least the following technical effects: the computer keyboard integrates not only the Tel telephone keypad, but also the NumLock numeric keypad, and further has various function operations and function keys of the scientific calculator, thereby giving full play to powerful functions of the calculator of the win10 of a personal computer (PC), and improving efficiency of human-computer interaction and user experience. Although an ordinary calculator and the scientific calculator can be used separately, the ordinary calculator and the scientific calculator are both independent of the PC, and cannot retain, copy and paste an operation process and an operation result into an application of the PC, and PC's own calculator can retain, copy and paste the operation process and the operation result into other applications, which is not achievable by an independent calculator arranged externally. The computer keyboard is integrated with the telephone keypad, such that it is convenient for people to make an Internet call or control a smart television to make a television call through the computer keyboard, and one-hand input of a nine-grid keyboard can be achieved through the T9 input method on the telephone keypad, which is important for a user who uses the T9 input method for a long time. In addition, when a mouse is used with a right hand, characters or numbers can be input with a left hand through the T9 input method, thereby improving input efficiency and user experience.

What is described above is merely preferred embodiments of the present disclosure, and is not intended to limit the present disclosure in any form. Although the present disclosure has been disclosed as above by means of the preferred embodiments, these embodiments are not intended to limit the present disclosure. Those skilled in the art can make certain changes or modifications by using the technical contents disclosed above without departing from the scope of the technical solutions of the present disclosure, so as to arrive at equivalent embodiments with equivalent changes. However, any simple amendments, equivalent changes, and modifications made to the above embodiments according to the technical essence of the present disclosure without departing from the contents of the technical solutions of the present disclosure still fall within the scope of the technical solutions of the present disclosure.

What is claimed is:

1. A computer keyboard with a telephone keypad, comprising:
    a main keyboard in QWERTY layout, wherein
    the main keyboard comprises an inner nine-grid numeric key area; and
    twelve keys of the telephone keypad comprising 123 456 789 *0 #are mapped to the inner nine-grid numeric key area and its surrounding;
    wherein in the main keyboard of the computer keyboard, standard keys are replaced with special keys, such that transition and conversion from oblique arrangement to vertical arrangement is achieved and the inner nine-grid 3*3 numeric key area vertically arranged is obtained, and the telephone keypad is mapped to the inner nine-grid numeric key area vertically arranged, and is superposed and multiplexed with keys of the inner nine-grid numeric key area.

2. The keyboard according to claim 1, wherein in the main keyboard, standard keys O, M and < are replaced with 1.25 times of special keys, such that transition and conversion from oblique arrangement to vertical arrangement is achieved and an inner nine-grid numeric key area vertically arranged is obtained, the telephone keypad is mapped to the inner nine-grid numeric key area vertically arranged, and is superposed and multiplexed with keys of the inner nine-grid numeric key area, and Fn+Tab=Tel is set to switch a function of an original key to a function of a telephone key.

3. The keyboard according to claim 1, wherein in the main keyboard, standard keys O, M and < are replaced with 1.25 times of special keys, such that transition and conversion from oblique arrangement to vertical arrangement is achieved and an inner nine-grid numeric key area vertically arranged is obtained, the telephone keypad is mapped to the inner nine-grid numeric key area vertically arranged, and is superposed and multiplexed with keys of the inner nine-grid numeric key area, Fn+Tab=Tel is set to switch a function of an original key to a function of a telephone key, and a numeric keypad is also superposed on the inner nine-grid numeric key area vertically arranged, is multiplexed with the keys of the inner nine-grid numeric key area, and adopts a same arrangement of 123 456 789 as the telephone keypad by means of a shift of a key NumLock.

4. The keyboard according to claim 1, wherein in the main keyboard, standard keys O, M and < are replaced with 1.25 times of special keys, such that transition and conversion from oblique arrangement to vertical arrangement is achieved and an inner nine-grid numeric key area vertically arranged is obtained, the telephone keypad is mapped to the inner nine-grid numeric key area vertically arranged, and is superposed and multiplexed with keys of the inner nine-box-grid numeric key area, Fn+\|=Tel is set to switch a function of an original key to a function of a telephone key, and a numeric keypad is also superposed on the inner nine-grid numeric key area vertically arranged, is multiplexed with the keys of the inner nine-grid numeric key area, and adopts a same arrangement of 123 456 789 as the telephone keypad by means of a shift of a key NumLock.

5. The keyboard according to claim 1, wherein in the main keyboard, standard keys O, M and < are replaced with 1.25 times of special keys, such that transition and conversion from oblique arrangement to vertical arrangement is achieved and an inner nine-grid numeric key area vertically arranged is obtained, the telephone keypad is mapped to the inner nine-grid numeric key area vertically arranged, and is superposed and multiplexed with keys of the inner nine-grid numeric key area, Fn+\|=Tel is set to switch a function of an original key to a function of a telephone key, a numeric keypad is also superposed on the inner nine-grid numeric key area vertically arranged, is multiplexed with the keys of the inner nine-grid numeric key area, and adopts a same arrangement of 123 456 789 as the telephone keypad by means of a shift of a key NumLock, and on the basis of the numeric keypad, various function operations and function keys of a scientific calculator are mapped to other keys around the inner nine-grid 3*3 numeric key area, and are superposed and multiplexed with the other keys, such that when a calculator of windows 10 runs in a scientific calculator mode, the keys implement various function operations and function keys of the scientific calculator.

6. The keyboard according to claim 1, wherein after a function of an original key and a function of a telephone key are switched by the key Tel, a total of 14 symbols comprising 123 456 789 *0 #, a comma and an English period are mapped to the telephone keypad, wherein * is mapped to a letter key I, #is mapped to a letter key M, the comma is mapped to a letter key N, and the English period is mapped to a letter key J.

7. The keyboard according to claim 1, wherein for a mechanical keyboard with light emitting diode (LED) backlight, in order to prompt key positions of the telephone keypad and a calculator keypad, the LED backlights of the telephone keypad and the calculator keypad are arranged to have different light emitting modes.

8. The keyboard according to claim 1, wherein the telephone keypad has twenty-six letters of a T9 input method and five Chinese character input strokes of a horizontal stroke, a vertical stroke, a left-falling stroke, a right-falling stroke and a turning stroke.

9. The keyboard according to claim 1, further including a body apparatus and a process arranged in the body apparatus.

10. A computer keyboard with a telephone keypad, comprising:
    a main keyboard in QWERTY layout; and
    an inner numeric key area arranged in the main keyboard in the QWERTY layout, wherein the inner numeric key area comprises nine keys vertically arranged in 3*3 and a plurality of keys adjacent to the nine keys, and is configured to be switched to a telephone function by means of a key Tel and to be switched to a calculator function by means of a key NumLock, wherein key Tel=key Fn+key Tab;

twelve keys of the telephone keypad comprising 123 456 789 *0 #, and two punctuation marks, are mapped to the inner numeric key area to achieve the telephone function; and fifteen keys of a calculator keypad comprising 123 456 789 0·+−*/ are mapped to the inner numeric key area to achieve the calculator function.

* * * * *